United States Patent [19]
Itoh

[11] Patent Number: 5,877,868
[45] Date of Patent: Mar. 2, 1999

[54] FACSIMILE MACHINE STORING IMAGE DATA IN TRANSMISSION BUFFER DURING MEMORY TRANSMISSION

[75] Inventor: Shingo Itoh, Komaki, Japan

[73] Assignee: Brother Kogyo Kabushiki Kaisha, Nagoya, Japan

[21] Appl. No.: 660,375

[22] Filed: Jun. 7, 1996

[30] Foreign Application Priority Data

Jun. 8, 1995 [JP] Japan ................................. 7-140970

[51] Int. Cl.⁶ .................................................... H04N 1/21
[52] U.S. Cl. ........................................... 358/404; 358/444
[58] Field of Search ................................. 358/400, 404, 358/405, 444, 468, 426, 403; H04N 1/21

[56] References Cited

U.S. PATENT DOCUMENTS

| | | | |
|---|---|---|---|
| 4,975,783 | 12/1990 | Takaoka | 358/404 |
| 5,038,226 | 8/1991 | Nagaishi | 358/404 |
| 5,212,566 | 5/1993 | U et al. | 358/404 |
| 5,479,403 | 12/1995 | Matsueda | 358/404 |
| 5,526,128 | 6/1996 | Fujiki et al. | 358/444 |

*Primary Examiner*—Kim Yen Vu
*Attorney, Agent, or Firm*—Oliff & Berridge, PLC

[57] ABSTRACT

A facsimile machine including an image retrieval unit for retrieving image data from an image of a document; a retrieval buffer memory for temporarily storing the image data retrieved by the image retrieval unit; an encoder for producing encoded data by encoding the image data stored in the retrieval buffer memory; a memory for storing the encoded data when the encoded data is not immediately transmitted after being encoded by the encoder; a transmission buffer for temporarily storing the encoded data before transmission of a facsimile transmission; and a buffer memory usage switching unit for switching use of the retrieval buffer memory and the transmission buffer so that the transmission buffer memory is used as a portion of the retrieval buffer memory when the encoder processes the image data for storage as encoded data in the memory.

12 Claims, 6 Drawing Sheets

FACSIMILE MACHINE STORING IMAGE DATA IN TRANSMISSION BUFFER DURING MEMORY TRANSMISSION

BACKGROUND OF THE INVENTION

1. Field of the Invention

The present invention relates to a facsimile machine and more particularly to a facsimile machine including a retrieval unit for retrieving data of an image from a document, an encoder for encoding the retrieved data, and a memory for storing the encoded data when the encoded data is not to be immediately facsimile transmitted.

2. Description of the Related Art

Generally facsimile machines are capable of two types of transmission. With the first type, the facsimile machine transmits encoded data immediately to a remote device. In the second type of transmission, the facsimile machine stores encoded data in a memory and transmits it at a later time. This first type of the facsimile transmission is called direct transmission and the second type of transmission is called memory transmission.

Conventional facsimile machines are provided with a retrieval buffer memory and an independent transmission buffer memory. Image data retrieved from a document by a retrieval unit is stored temporarily in the retrieval buffer memory before being encoded by an encoder. When the encoded data is to be facsimile transmitted, the encoded data is temporarily stored in the transmission buffer memory. The retrieval buffer memory and the transmission buffer memory are separate units used independently during direct transmission and memory transmission.

However, retrieval processes for retrieving image data from a document are performed faster than encoding processes. As a result, while the image data is encoded by the encoder during memory transmission, if the memory capacity of the retrieval buffer memory is too small, then the image data retrieved by the retrieval unit at a quicker rate quickly fills empty space in the retrieval buffer memory. This can result in termination of retrieval operations, so that time required to retrieve a document's image increases. Although, such a problem can be overcome by increasing the memory capacity of the retrieval buffer memory, this requires provision of a large capacity RAM, which would increase production costs.

SUMMARY OF THE INVENTION

It is an objective of the present invention to overcome the above-describe problems and provide a facsimile machine capable of memory transmission but having a retrieval buffer memory without a large memory capacity.

To achieve the above-described objectives, a facsimile machine according to the present invention includes an image retrieval unit for retrieving image data from an image of a document; a retrieval buffer memory for temporarily storing the image data retrieved by the image retrieval unit; an encoder for producing encoded data by encoding the image data stored in the retrieval buffer memory; a memory for storing the encoded data when the encoded data is not immediately transmitted after being encoded by the encoder; a transmission buffer for temporarily storing the encoded data before transmission of a facsimile transmission; and a buffer memory usage switching means for switching use of the retrieval buffer memory and the transmission buffer so that the transmission buffer memory is used as a portion of the retrieval buffer memory when the encoder processes the image data for storage as encoded data in the memory.

Although, the transmission buffer is required during direct transmissions of facsimile messages, it is not required when the encoder is encoding image data and storing the encoded data in the memory. Therefore, the transmission buffer can be used as a portion of the retrieval buffer. This allows a practical increase in the memory capacity of the retrieval buffer memory without actually increasing the overall memory capacity of a RAM which forms both the retrieval buffer and the transmission buffer. As a result, encoding processes and processes for storing the encoded data can be quickly performed without increasing the memory capacity of the RAM, that is to say, without increasing manufacturing costs.

According to another aspect of the present invention, the transmission buffer memory has a leading address and a last address and the retrieval buffer memory has a last address, the leading address of the transmission buffer memory being next in succession after the last address of the retrieval buffer memory; and the buffer memory usage switching means changes the last address of the retrieval buffer memory to the last address of the transmission buffer memory when the encoder processes the image data for storage as encoded data in the memory.

According to still another aspect of the invention, a facsimile machine includes an image retrieval unit for retrieving image data from an image of a document; a retrieval buffer memory for temporarily storing the image data retrieved by the image retrieval unit; an encoder for producing encoded data by encoding the image data stored in the retrieval buffer memory; a memory for storing the encoded data for a later transmission; a transmission buffer for temporarily storing the encoded data for transmission of a facsimile transmission; transmission check means for determining whether the facsimile machine is presently transmitting; and image data storage control means for controlling storage of the image data so that the image data is stored in at least one of the retrieval buffer memory and the transmission buffer when the transmission check means determines that the facsimile machine is not presently transmitting.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
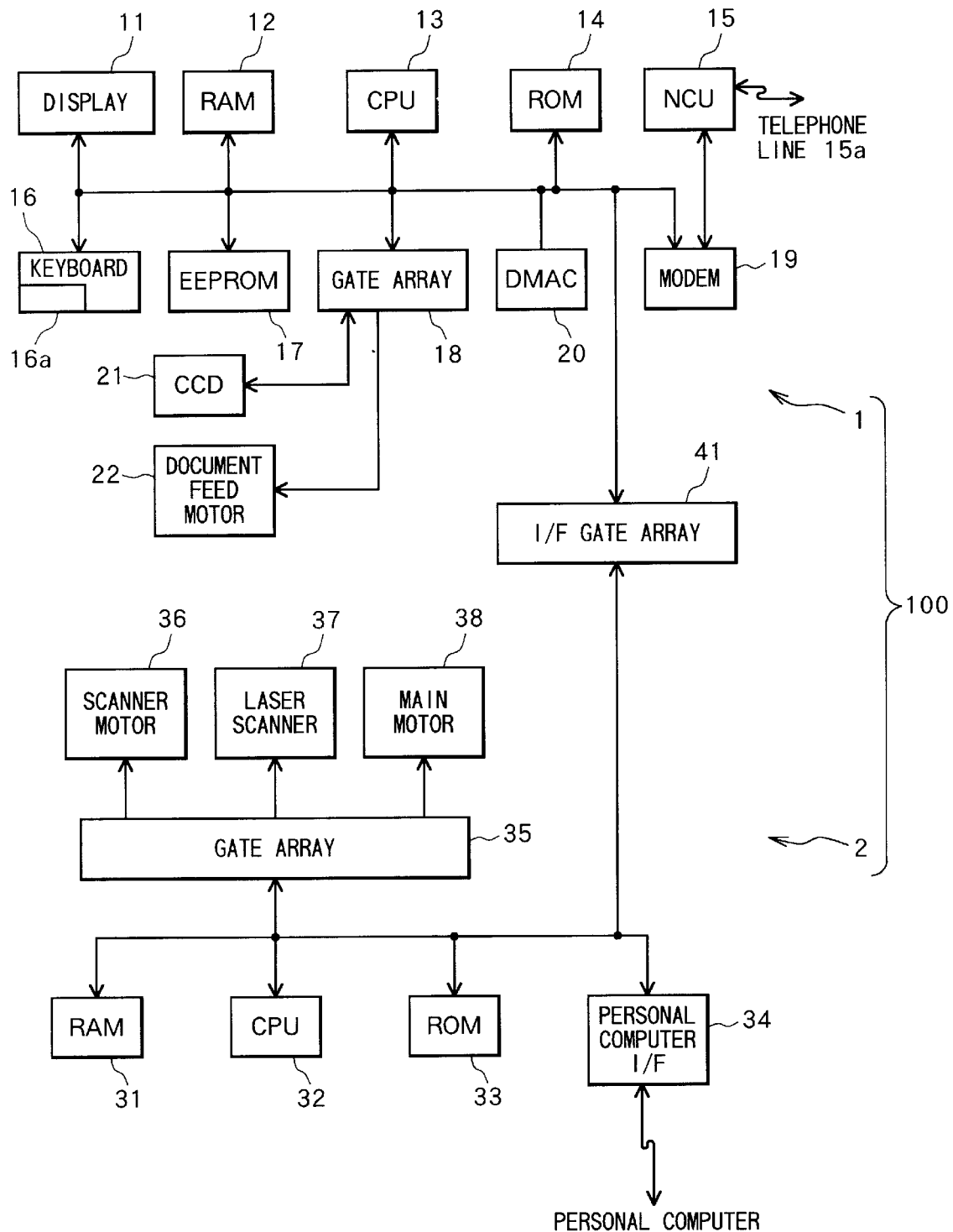
FIG. 1 is block diagram showing essential components of a facsimile machine according to an embodiment of the present invention.

A facsimile machine according to a preferred embodiment of the present invention will be described while referring to the accompanying drawings wherein like parts and components are designated by the same reference numerals to avoid duplicating description.

FIG. 1 is a block diagram showing essential components of a facsimile machine 100 according to the present embodiment. The facsimile machine 100 includes a facsimile portion 1 and a printer portion 2. The facsimile portion 1 includes a display 11, such as a liquid crystal display (LCD), disposed on an operation panel (not shown) and for displaying time and the like; a RAM 12 for storing a variety of data; a CPU 13 for performing overall control operations of the facsimile machine 100; a ROM 14 for storing a variety of programs executed by the CPU 13; a network control unit (NCU) 15 connected to a telephone circuit 15a and for performing network control; a keyboard 16 disposed on the operation panel and for outputting signals according to operations by a user; an EEPROM 17 for storing certain flags and a telephone book including shortened dialing numbers and names of frequently called parties; a gate array 18; a modem 19 for modulating signals to be transmitted and demodulating received signals; and a direct memory access control (DMAC) 20 for transmitting data directly from the RAM 12. A charge coupled device (CCD) 21 and a document feed motor 22 are connected to the gate array 18. The CCD 21 is for reading images from documents and outputting image data having the same density as the images of the documents. The document feed motor 22 is for transporting documents at a predetermined pitch. A transmission mode switch 16a is provided to the keyboard 16. With the transmission mode switch 16a, a user can set the facsimile machine 100 to a memory transmission mode or a direct transmission mode. In the memory transmission mode, facsimile data of a document is not transmitted immediately after being retrieved from a document and encoded, but is instead stored as encoded data in an encoded data storage region 53 to be described later.

The printer portion 2 includes a RAM 31 for storing a variety of data; a CPU 32 for performing overall control operations of the printer portion 2; a ROM 33 for storing a variety of programs and character patterns; a computer interface 34 for connecting the facsimile machine to an external computer (not shown); and a printer gate array 35. A scanner motor 36, laser scanner 37, and a main motor 38, among other components, are connected to the gate array 35. The laser scanner 37 is driven by the scanner motor 36 to scan a laser beam for recording. The main motor 38 is for driving transport of recording sheets and agitation of toner, among other operations. The facsimile portion 1 and the printer portion 2 are connected via an interface gate array 41.

Figure 2:
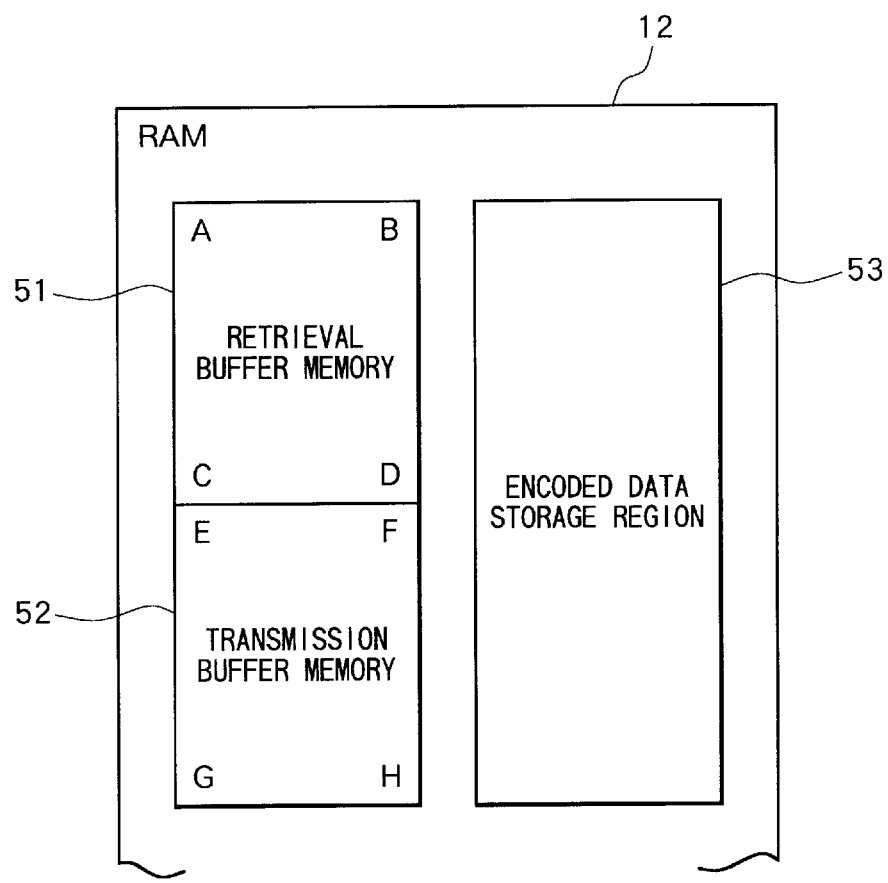
FIG. 2 is a schematic view showing storage regions of a RAM of the facsimile machine shown in FIG. 1.

FIG. 2 is a schematic diagram showing storage regions of the RAM 12. The RAM 12 is formed with a retrieval buffer memory 51, a transmission buffer memory 52, and an encoded data storage region 53. The retrieval buffer memory 51 includes a lead address A, addresses B and C, and an end address D. The address B is the last address on the same line as the lead address A, wherein line refers to image data retrieved from a document by the CCD 21 in a single scan from one edge of the document to another in a widthwise, or main scanning, direction. The address C is the starting address of the same line as the end address D. The transmission buffer memory 52 includes a lead address E, addresses F and G, and an end address H. The address F is the last address on the same line as the lead address E and the address G is the starting address on the same line as the end address H. In other words, the end address D of the retrieval buffer memory 51 has a value one prior to the lead address E of the transmission buffer memory 52. That is to say, the retrieval buffer memory 51 and the transmission buffer memory 52 are formed from regions connected to each other in the RAM 12.

Figure 3:
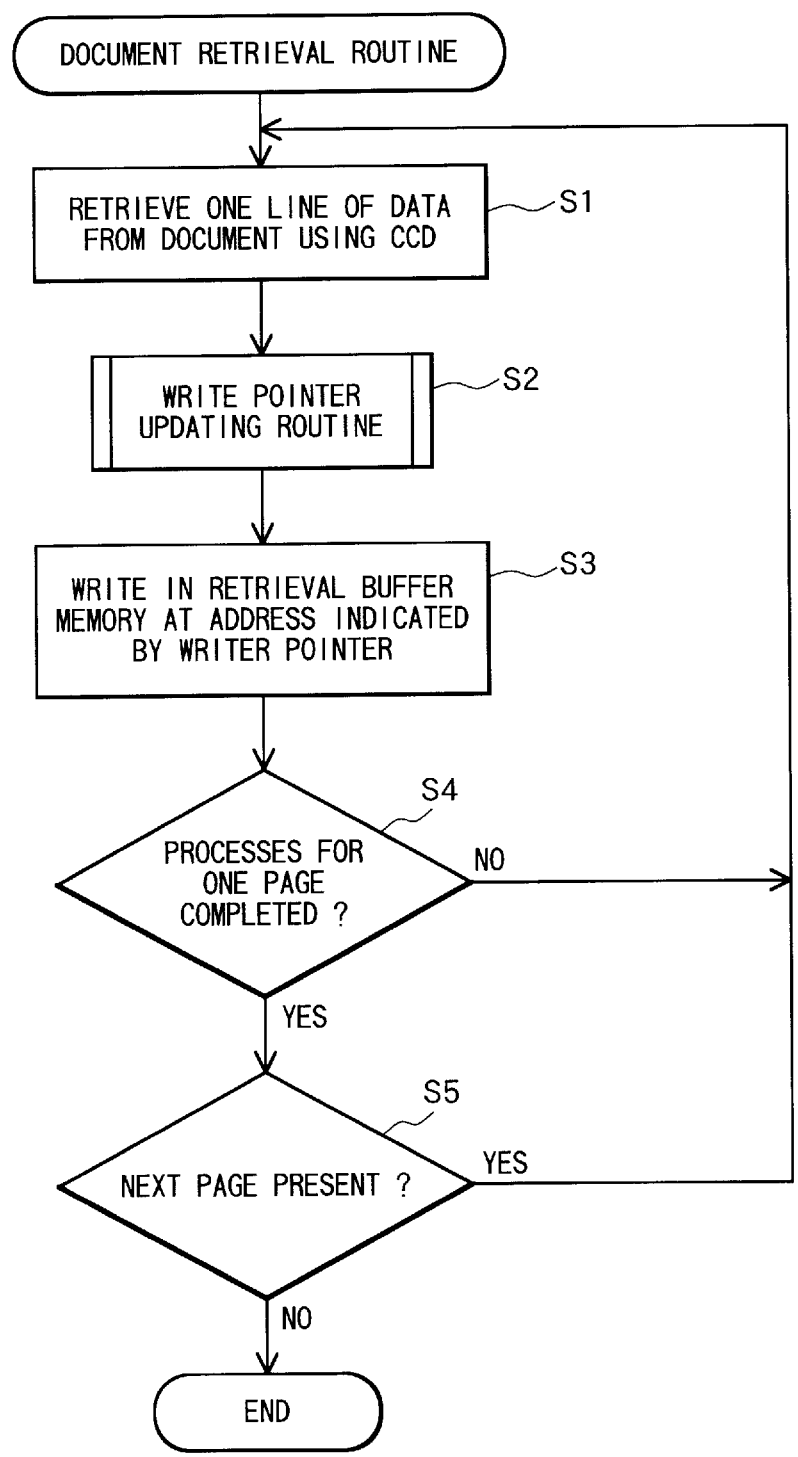
FIG. 3 is a flowchart representing a document retrieval routine of the facsimile machine.

Next, while referring to the flowchart shown in FIG. 3, an explanation will be provided for a document retrieval routine performed by the facsimile machine configured as described above to retrieve image data from a document using the CCD 21 and to write the image data in the retrieval buffer memory 51. At the start of this routine, the first line of data is retrieved from the document using the CCD 21 in step 1. Hereinafter, individual steps will be referred to in the drawings and following text as Si, wherein i is the number of an individual step. Then, the CPU 13 updates a write pointer and the like of the retrieval buffer memory 51 in a write pointer updating routine of S2 represented by a flowchart shown in FIG. 4. The write pointer indicates an address where image data from the CCD 21 is to be stored.

At the start of the write pointer updating routine, in S11 the CPU 13 retrieves a pointer value of the write pointer of the retrieval buffer memory 51 and stores it in a register (not shown in the drawings). Next, the CPU 13 updates the write pointer of the retrieval buffer memory 51 in S12. That is, the CPU 13 adds the address value of one line's worth of image data to the write pointer value retrieved in S11 and rewrites the value in the register.

Then in S13, the CPU 13 determines whether or not the facsimile machine is in the direct transmission mode. The CPU 13 makes this determination by determining whether the CPU 13 is encoding the image data for storage as encoded data in the encoded data storage regions 53, by checking setting of the transmission mode switch 16a, or by determining whether the facsimile machine 100 is presently transmitting. If the facsimile machine 100 is in the memory transmission mode (S13:NO), then the CPU 13 determines in S14 whether or not the pointer value updated in S12 is the address directly after the end address H of the transmission buffer memory 52. If the pointer value indicates that the address is directly subsequent to the end address H of the transmission buffer memory 52 (S14:YES), then the CPU 13 updates the pointer value to the lead address A of the retrieval buffer memory 51 in S15, then saves the write pointer of the retrieval buffer memory 51 in S16. That is, the CPU stores the lead address A as the write pointer of the retrieval buffer memory 51, whereupon this routine is ended, that is, proceeds to S3 shown in the flowchart of FIG. 3.

If in S14, the pointer value does not indicate the address subsequent to the end address H of the transmission buffer memory 52 (S14:NO), then the program proceeds to S16, whereupon the pointer value updated in S12 is stored as the write pointer of the retrieval buffer memory 51.

When in S13, it is determined that the facsimile transmission is in the direct transmission mode (S13:YES), then the CPU 13 determines in S17 whether or not the pointer value updated in S12 is the lead address E of the transmission buffer memory 52, that is, the value next in succession after the end address D of the retrieval buffer memory 51. When it is determined that the pointer value updated in S12 is not the lead address E of the transmission buffer memory 52 (S17:NO), then the program proceeds to S16 where the value updated in S12 is stored as the pointer value for the write pointer. When it is determined in S17 that the pointer value updated in S12 is the lead address E of the transmission buffer memory 52 (S17:YES), then the program proceeds to S15, where the pointer value is updated to the lead address A of the retrieval buffer memory 51.

After the pointer value is stored in S16, next in S3, the CPU 13 writes the image data from S1 in the retrieval buffer memory 51 at the address indicated by the write pointer. In other words, while the facsimile machine 100 is in the memory transmission mode so that encoded data is stored in the encoded data storage region 53 without being transmitted as a facsimile message, the usage condition of the buffer memory is changed so that the transmission buffer memory 52 is used as a portion of the retrieval buffer memory 51. Afterward, whether or not processes are completed for one page's worth of image data is determined in S4. If not (S4:NO), then the routine returns to S1 whereupon processes of S1 through S4 are performed until one page's worth of image data is processed. If processes are completed for one page's worth of image data (S4:YES), then whether or not a next page exists is determined in S5. If so, then the routine returns to S1 whereupon processes of S1 through S5 are performed until all page's worth of image data are processed. If no next page is present (S5:NO), then this routine is ended.

In this way, if a facsimile transmission is being performed (S13:YES), then processes for updating the pointer value continue in S15, S16, and S17 until the pointer value of the write pointer in the retrieval buffer memory 51 indicates the lead address E of the transmission buffer memory 52, that is, the value after the end address D of the retrieval buffer memory 51. As a result, the retrieval buffer memory 51 only is used as the retrieval buffer memory during the direct transmission mode.

On the other hand, when no facsimile transmission is being performed, that is, during the memory transmission mode (S13:NO), then processes for updating the pointer value of the write pointer in the retrieval buffer memory 51 are continued in S14, S16, and S15 until the pointer value indicates the value after the end address H of the transmission buffer memory 52. As a result, the transmission buffer memory 52 is also used as retrieval buffer memory in addition to the retrieval buffer memory 51 when retrieving image data from a document during the memory transmission mode. Said differently, the capacity of the retrieval buffer memory 51 is increased by an amount equivalent to the transmission buffer memory 52.

Furthermore, the lead address E of the transmission buffer memory 52 is next in succession after the end address of the retrieval buffer memory 51. Therefore, by merely changing the setting of the end address during the pointer updating routines, the transmission buffer memory 52 can be used as only the transmission buffer memory 52 or as a portion of the retrieval buffer memory. This makes switching processes extremely easy.

Figure 4:
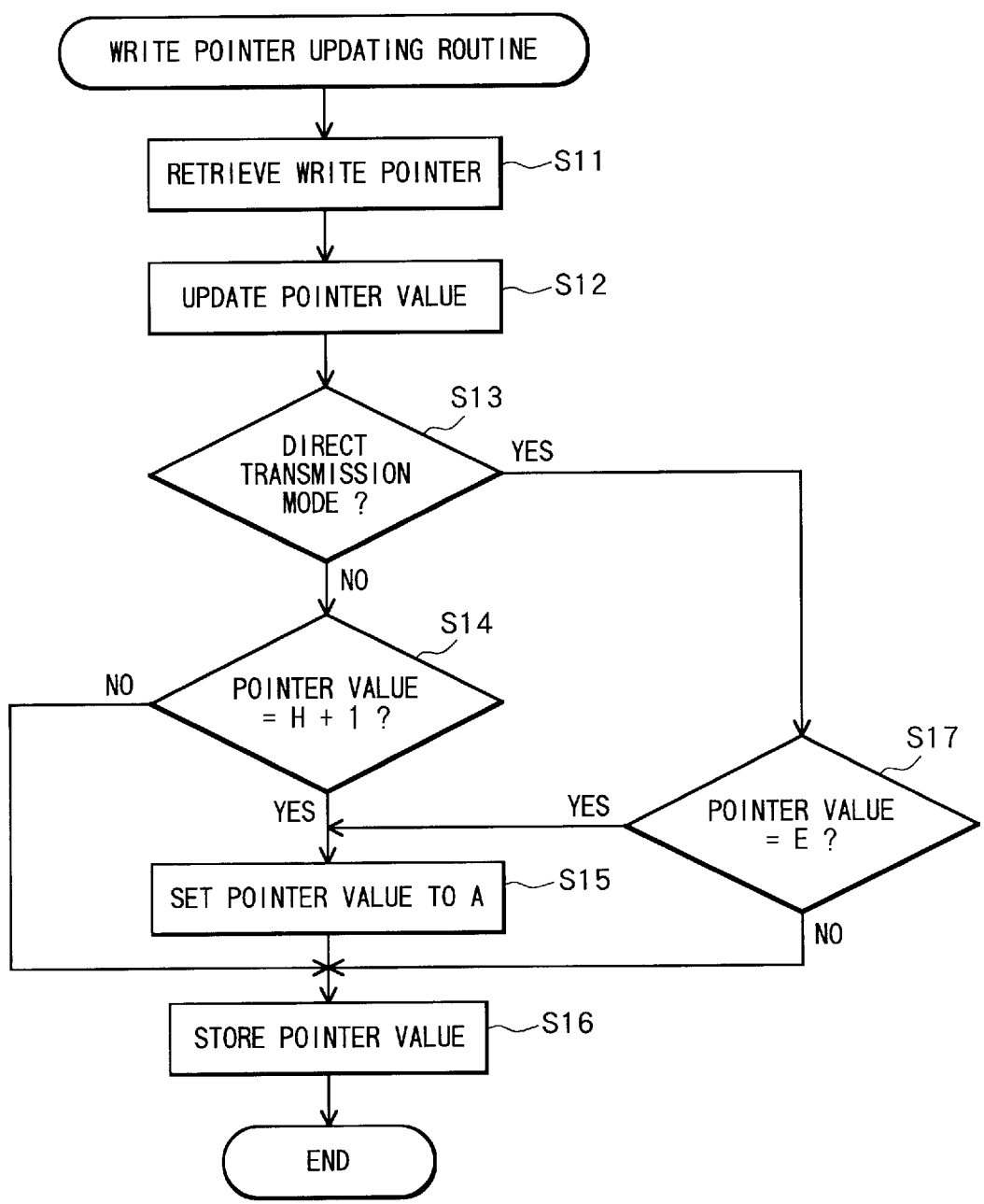
FIG. 4 is a flowchart representing a write pointer updating routine of the document retrieval routine shown in FIG. 3.
Figure 5:
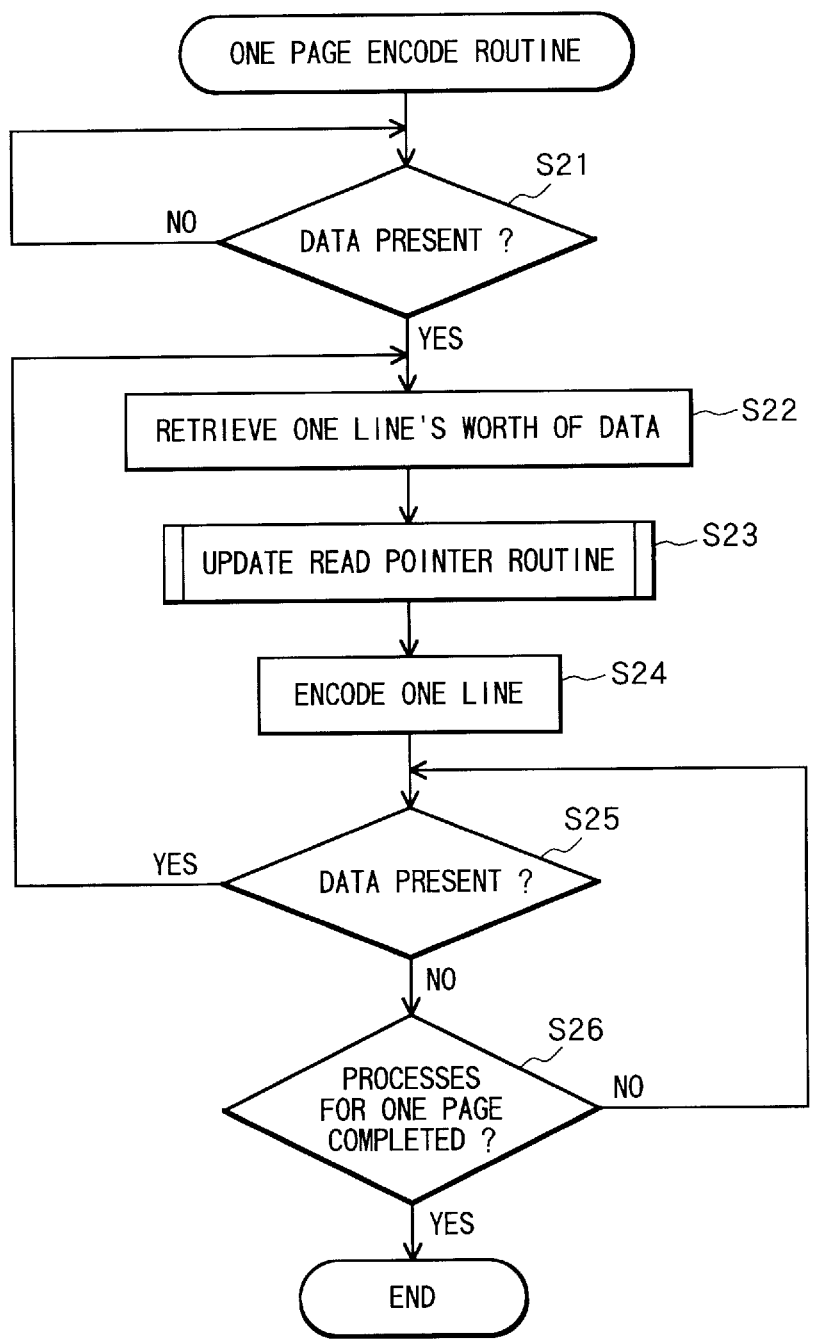
FIG. 5 is a flowchart representing a one page encoding routine of the facsimile machine.
Figure 6:
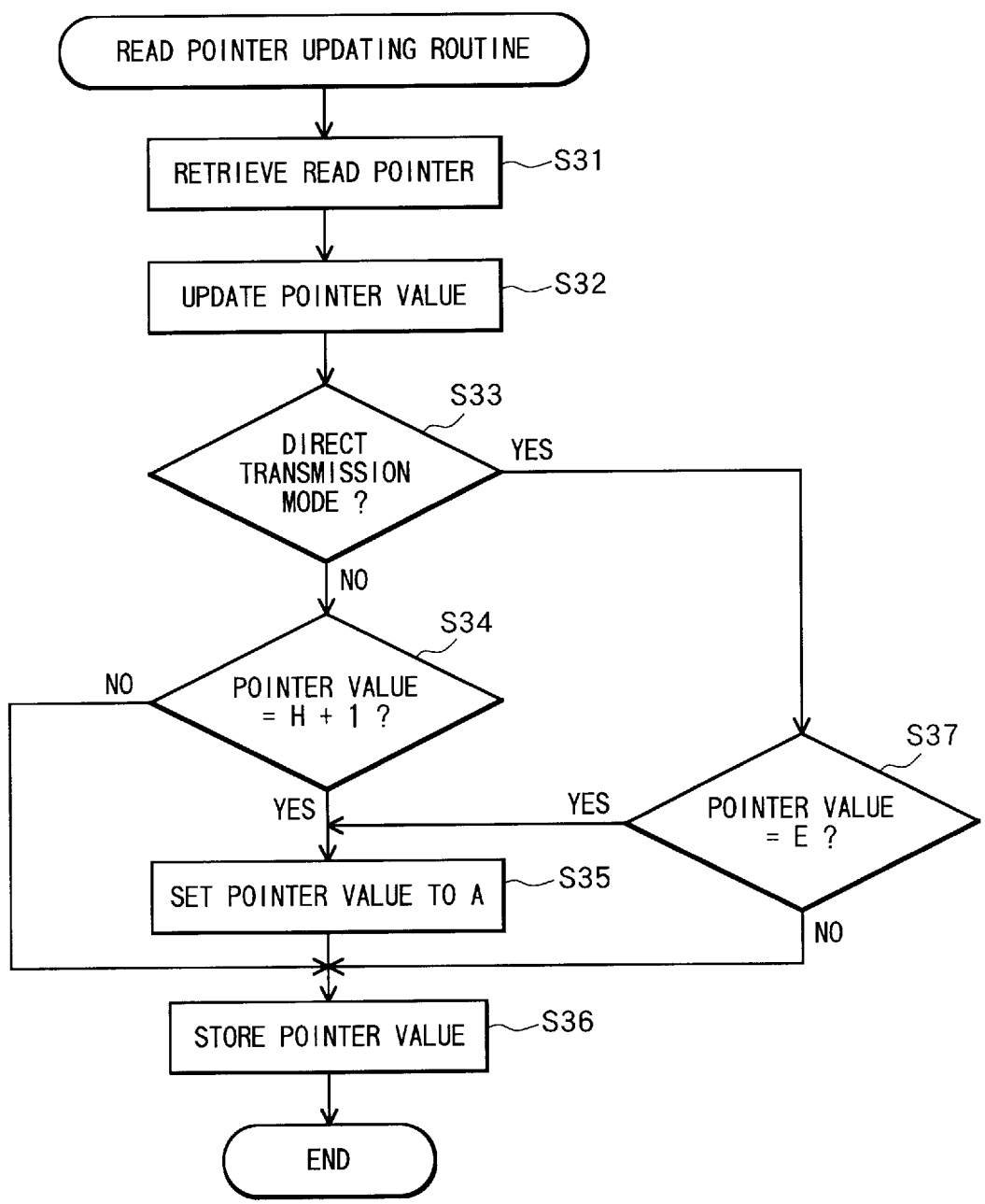
FIG. 6 is a flowchart representing a read pointer updating routine of the one page encoding routine shown in FIG. 5.

Next, an explanation will be provided for a one page encode routine while referring to the flowcharts in FIGS. 5 and 6. The one page encode routine is performed in parallel with the document retrieval routine and is activated when image data from the CCD 21 is present in the retrieval buffer memory 51. When the one page encoding routine is started, whether or not image data from the CCD 21 exists in the retrieval buffer memory 51 is determined in S21. If image data exists in the retrieval buffer memory 51 (S21:YES), then further processes can be performed, so one line's worth of image data from the document is read from the retrieval buffer memory 51 in S22. Next, in S23, the CPU 13 updates the read pointer to indicate the next retrieval address. This updating process is similar to the write pointer updating routine of FIG. 4 and will be explained later. Next, in S24 the CPU 13 encodes the one line's worth of data retrieved from the retrieved buffer memory in S22. If the facsimile machine 10 is in the memory transmission mode, in S4 the CPU 13 stores the encoded data in the encoded store region 53. On the other hand, if the facsimile machine 10 is in the direct transmission mode, in S4 the CPU 13 stores the encoded data in the transmission buffer memory 52.

Next, the CPU 13 determines in S25 whether or not image data further exists in the retrieval buffer memory 51. If image data exists (S25:YES), then processes can be continued so the program returns to S22, whereupon processes are performed on another line's worth of the image data. On the other hand, if no image data exists in the retrieval buffer memory 51 (S25:NO), then the CPU 13 determines in S26 whether or not processes have been performed on an entire page's worth of data. When processes have not been performed on an entire page's worth of image data (S26:NO), then the program returns to S25, whereupon input of further data in the retrieval buffer memory 51 is awaited. On the other hand, when processes have been performed on one entire page's worth of image data (S26:YES), then this routine is ended. If in S21, it is determined that no image data exists in the retrieval buffer memory 51 (S21:NO), then processes can not be performed, so the program returns to S21 and awaits input of image data to the retrieval buffer memory 51.

Next, the read pointer updating routine performed in S23 of FIG. 5 for updating the read pointer of the retrieval buffer memory 51 will be explained while referring to the flowchart shown in FIG. 6.

First, in S31 the CPU 13 stores a pointer value for the read pointer of the retrieval buffer memory 51 in a register (not shown in the drawings). Next, the CPU 13 updates the read pointer of the retrieval buffer memory in S32. That is, the CPU 13 adds the address value of one line's worth of image data to the read pointer value retrieved in S31 and rewrites the value in the register.

Next, the CPU 13 performs in S33 through S37, the same operations as described in S13 through S17 of the flowchart in FIG. 4 to update the read pointer and like of the retrieval buffer memory 51. After the read pointer updating routine is ended, the program returns to S23 of FIG. 5.

In order to store encoded data in the encoded storage region 53 while the CPU 13 is encoding image data and storing the encoded data in the encoded data storage region 53, that is, without transmitting the encoded data to a remote facsimile machine in a facsimile transmission, the CPU 13 switches usage condition of buffer memory so that the transmission buffer memory 52 is used as a portion of retrieval buffer memory 51. As a result, the memory capacity of the retrieval buffer memory 51 increases by the memory capacity of the transmission buffer memory 51. Therefore, processes for retrieving image data from a document using the CCD 21, for encoding the retrieved image data, and for storing the encoded data in the encoded data storage region 53 without transmitting the encoded data in a facsimile transmission can be performed quickly without increasing the basic capacity of the retrieval buffer memory 51, that is to say, without increasing costs by increasing the basic memory capacity of the RAM 12.

Also, the lead address of the transmission buffer memory is subsequent to the end address of the retrieval buffer memory. When the CPU 13 stores encoded data in the encoded data storage region 53 without transmitting encoded data directly in a facsimile transmission, the CPU 13 updates the end address of the retrieval buffer memory 51 to the last address of the transmission buffer memory 52 by merely changing the setting of the end address. In this way, the transmission buffer memory 52 can be used either as a portion of the retrieval buffer memory 51 or as the transmission buffer memory 52 itself. This switching process can be performed easily.

While the invention has been described in detail with reference to specific embodiments thereof, it would be apparent to those skilled in the art that various changes and modifications may be made therein without departing from the spirit of the invention, the scope of which is defined by the attached claims.

For example, although in the above-described embodiment, the retrieval buffer memory 51 and the transmission buffer memory 52 were formed by successive regions in the RAM 12, the retrieval buffer memory 51 and the transmission buffer memory 52 could be formed by unconnected regions in the RAM 12. In this case, by performing an address maintenance routine using the CPU 13, the transmission buffer memory 52 could be used as a portion of the retrieval buffer memory 51.

What is claimed is:

1. A facsimile machine comprising:

an image retrieval unit for retrieving image data from an image of a document;

a retrieval buffer memory for temporarily storing the image data retrieved by the image retrieval unit;

an encoder for producing encoded data by encoding the image data stored in the retrieval buffer memory;

a memory for storing the encoded data when the encoded data is not immediately transmitted after being encoded by the encoder;

a transmission buffer memory for temporarily storing the encoded data before transmission of a facsimile transmission; and a buffer memory usage switching means for switching use of the transmission buffer memory so that the transmission buffer memory is only used as a portion of the retrieval buffer memory when the encoder processes the image data for storage as encoded data in the memory.

2. A facsimile machine as claimed in claim 1 wherein:

the transmission buffer memory has a leading address and a last address and the retrieval buffer memory has a last address, the leading address of the transmission buffer memory being next in succession after the last address of the retrieval buffer memory; and the buffer memory usage switching means changes the last address of the retrieval buffer memory to the last address of the transmission buffer memory when the encoder processes the image data for storage as encoded data in the memory.

3. A facsimile machine as claimed in claim 1 further comprising address management means for managing addresses where the image data is to be stored, the buffer memory usage switching means controlling the address management means to use the transmission buffer memory as a portion of the retrieval buffer memory when the encoder processes the image data for storage as encoded data in the memory.

4. A facsimile machine as claimed in claim 1 further comprising a write pointer indicating a position where the image data from the image retrieval unit is to be written, the buffer memory usage switching means controlling the write pointer to indicate, when the encoder processes the image data for storage as encoded data in the memory and after the retrieval buffer memory is full, an address in the transmission buffer memory.

5. A facsimile machine as claimed in claim 4 further comprising a read pointer indicating a position from which the image data is retrieved for encoding processes, the buffer memory usage switching means controlling the write pointer to indicate, when the encoder processes the image data for storage as encoded data in the memory and after the image data has been read from all addresses in the retrieval buffer memory, an address in the transmission buffer memory.

6. A facsimile machine comprising:

an image retrieval unit for retrieving image data from an image of a document;

a retrieval buffer memory for temporarily storing the image data retrieved by the image retrieval unit;

an encoder for producing encoded data by encoding the image data stored in the retrieval buffer memory;

a memory for storing the encoded data for a later transmission;

a transmission buffer memory for temporarily storing the encoded data for transmission of a facsimile transmission;

transmission check means for determining whether the facsimile machine is presently transmitting; and image data storage control means for controlling storage of the image data so that the image data is stored in at least one of the retrieval buffer memory and the transmission buffer memory when the transmission check means determines that the facsimile machine is not presently transmitting.

7. A facsimile machine as claimed in claim 6 wherein:

the transmission buffer memory has a leading address and a last address and the retrieval buffer memory has a last address, the leading address of the transmission buffer memory being next in succession after the last address of the retrieval buffer memory; and the image data storage control means changes the last address of the retrieval buffer memory to the last address of the transmission buffer memory when the transmission check means determines that the facsimile machine is not presently transmitting.

8. A facsimile machine as claimed in claim 6 further comprising address management means for managing addresses where the image data is to be stored, the image data storage control means controlling the address management means to store the image data retrieved by the image retrieval unit in at least one of the retrieval buffer memory and in the transmission buffer memory when the transmission check means determines that the facsimile machine is not presently transmitting.

9. A facsimile machine as claimed in claim 6 further comprising a write pointer indicating a position where the image data from the image retrieval unit is written, the image data storage control means controlling the write pointer to indicate, when the transmission check means determines that the facsimile machine is not presently transmitting and after the retrieval buffer memory is full, an address in the transmission buffer memory.

10. A facsimile machine as claimed in claim 9 further comprising a read pointer indicating a position from which the image data is retrieved for encoding processes, the buffer memory usage switching means controlling the write pointer to indicate, when the transmission check means determines that the facsimile machine is not presently transmitting and after the image data has been read from all addresses in the retrieval buffer memory, an address in the transmission buffer memory.

11. A facsimile machine as claimed in claim 6 wherein the transmission check means determines whether the facsimile machine is presently transmitting by determining whether the facsimile machine is in a direct transmission mode wherein encoded data is transmitted via the transmission buffer memory without being stored in the memory.

12. A facsimile machine as claimed in claim 6 further comprising a transmission mode switch for selectively setting the facsimile machine into a direct transmission mode, wherein encoded data is transmitted via the transmission buffer memory without being stored in the memory, and a memory transmission mode, wherein encoded data is stored in the memory before being transmitted, the transmission check means determining whether the facsimile machine is presently transmitting by checking setting of the transmission mode switch.

\* \* \* \* \*